Dec. 12, 1967    J. S. SHAFFER    3,357,153
PROCESS AND APPARATUS FOR HEAT SHRINKING FILM
Filed July 23, 1965

United States Patent Office 3,357,153
Patented Dec. 12, 1967

3,357,153
PROCESS AND APPARATUS FOR HEAT SHRINKING FILM
James S. Shaffer, Spartanburg, S.C., assignor to W. R. Grace & Co., Duncan, S.C., a corporation of Connecticut
Filed July 23, 1965, Ser. No. 474,247
4 Claims. (Cl. 53—30)

ABSTRACT OF THE DISCLOSURE

This invention is directed to apparatus comprising a shrink tunnel having a U-shaped internal housing with an insulated casing uniformly spaced outwardly from the housing forming a chamber therebetween, the majority of the hot air injected into the tunnel through apertures in the lower portions of the side walls of the housing, the air reclaimed through a single central outlet in the top wall of the housing, heating means positioned in the chamber, and a rotatable blowing means positioned in the chamber above the outlet; and a process for heat shrinking film by forcibly impinging hot air only on the sides of a wrapped product in a heating zone, recovering the air only from a single upper central portion of the heating zone, blowing the air through a reheating zone extending around the periphery of the heating zone; all as further described hereinafter.

---

This invention relates to the heat shrinking of thermoplastic film.

It is well known to employ various flexible, heat shrinkable sheet materials in the packaging of products, including food products. These heat shrinkable materials provide an inexpensive, substantially air-tight package which will prevent contamination of the product when properly heat sealed and which will maintain perishable items in a state of freshness for a relatively long period of time. In addition, these films enhance the appearance of the product and conform to the contours of the object due to their transparency and shrinking characteristics respectively.

A number of devices (so-called "heat shrinking tunnels") have been proposed for heat shrinking the film about the object. These tunnels frequently employ hot air in a tunnel with a conveyor for transporting the product therethrough. The tunnels are inefficient in that a large amount of heated air is wasted and the shrinking results in a nonsmooth film. This is particularly undesirable in the packaging of meat products overwrapped in film. The bunching of film at the bottom makes it difficult to eliminate the forming of "capillaries" after shrinking which are collection points for blood thereby presenting an undesirable appearance.

It is an object of the invention to provide a method for heat shrinking thermoplastic film.

Another object is to provide apparatus for heat shrinking thermoplastic film.

These and other objects of the invention will be readily apparent to those skilled in the art from the accompanying disclosure, drawing and appended claims.

These objects are broadly accomplished by forcibly impinging hot air only on the sides of a product overwrapped in film in a heating zone, recovering hot air only from an upper central portion of said zone, blowing the hot air through an annulus around the periphery of the zone, reheating the air within the annulus and discharging the air onto said product.

The invention is not to be limited to any particular type, shape, or size of product or to any particular type of heat-shrinkable film. Any of the well-known heat-shrinkable thermoplastic films may be employed, such as the oriented polyolefins (including, but not limited to polyethylene, polypropylene, polybutene-1), the polyvinyls, the polyesters, vinylidene chloride polymers (such as Saran), polyamides (such as nylon), polystyrene and the like. The particular temperatures employed will vary therewith. The term "polymer" as employed herein includes homopolymers, copolymers, terpolymers, block copolymers, random copolymers, graft polymers and the like. The films may also be laminates of different films. The films must be heat shrinkable and are thus molecularly oriented, either monoaxially or biaxially oriented. The films, e.g. polyethylene, may be irradiated such as described in patents to Baird, U.S. 3,022,543, and Rainer et al., U.S. 2,877,500, incorporated herein by reference. Preferably the film is 0.1 to 20 mils thick.

The invention is broadly applicable to any type of product including nonfoods such as toys, books, clothing, overwrap on cartons, and the like, and foods such as bananas, other fruits, vegetables, poultry, poultry and turkey byproducts, and meat products and the like either with or without a tray or other carrying means. The efficiency of the forcibly impinging hot air and the very short period of exposure to elevated temperatures makes the device particularly suitable for products easily damaged by heat.

The temperatures of the air in the heating tunnel will depend on such factors as the product, size of product, temperature of product, type and thickness of film employed and the type of overlap employed and the like. In any case, the air will be heated above the heat sealing temperature of the film, for example, an air temperature of 250°–600° F. is preferred for heat sealing an irradiated polyethylene which has been biaxially oriented.

It is particularly important that the air be forcibly impinged onto the film, especially on the overlapped film area. For example, the air is preferably introduced through the heat shrinking orifices at 100 to 1,000 ft./min., preferably 200 to 600 ft./min. The size of the orifice may be adjusted in size to provide these velocities. A suitable aperture size is ⅛–⅜ inch in diameter. Suitable means, such as plugs, may be employed to permit variation in the number of apertures open to passage of air depending on the size or shape of the product. It is also important that the air not be static in any of the areas in the tunnel.

The method of wrapping the film about the product is well within the skill of the art. A particularly suitable method of wrapping meat products is to place the overlapped film portion beneath the product with the overlap then resting on the conveyor.

Figure 1:
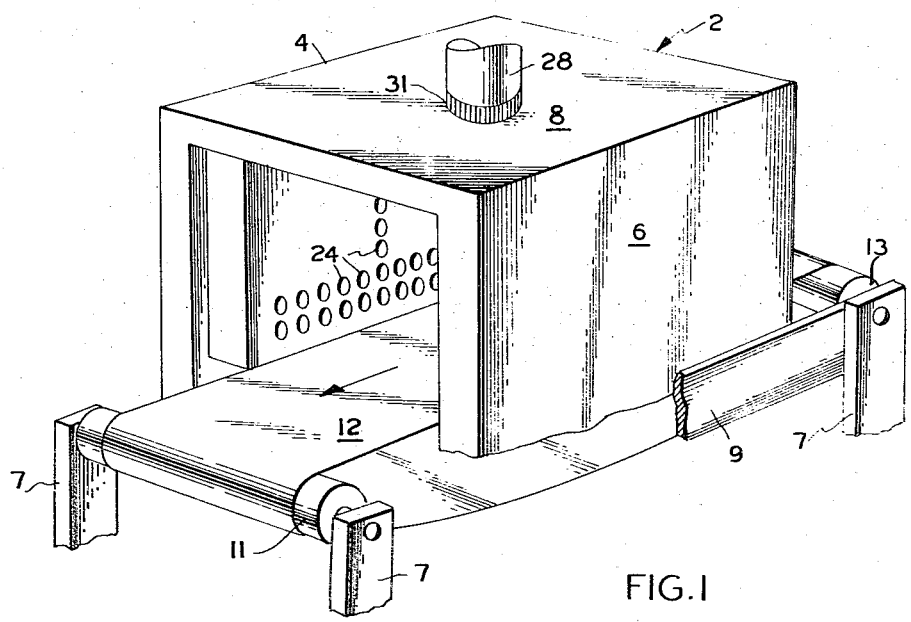
FIGURE 1 is a perspective view of the shrink tunnel and conveyor.

The invention is best illustrated by reference to the drawing. FIGURE 1 is a perspective view of a shrink tunnel 2 of the invention having walls 4, 6 and 8 with a conveyor belt 12 for transporting a package 10 through the heating portion of the tunnel. The housing is shown as open at both ends although curtains or drapes may be used to reduce the heat loss. Any suitable conveying means may be employed for transporting the film-overwrapped package horizontally through the lower portion of the inverted U-shaped housing. For example, endless belt 12 (wire, cloth, Teflon, etc.) is suitably mounted on rollers 11 and 13 journalled in leg support members 7. The shrink tunnel 2 may be supported by any suitable means such as being attached to frame member 9 suitably attached to leg members 7. A motor 28 is positioned above the central portion of the top wall 8. Apertures 24 on the side walls 20, 20a permit hot air to be directed onto the package resting on the conveyor.

Figure 2:
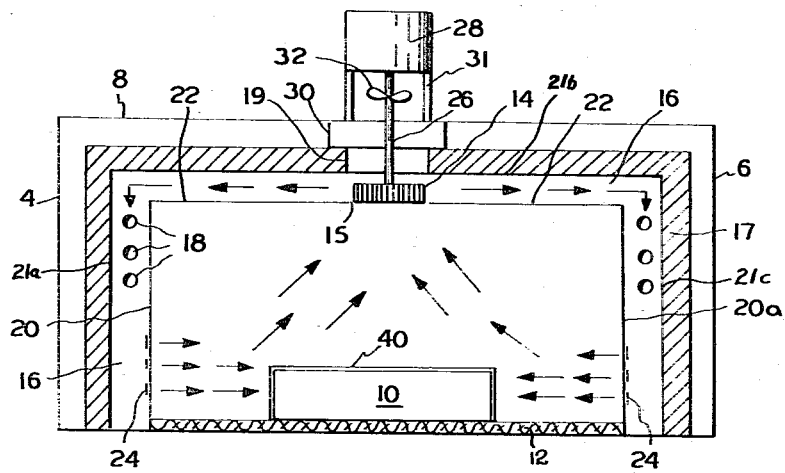
FIGURE 2 is a vertical cross section of the shrink tunnel.

FIGURE 2 is a vertical cross section of the shrink tunnel 2 and upper portion of the conveyor belt 12. A casing having walls 21a, 21b, 21c is uniformly spaced apart from housing having walls 20, 22, 20a to form an annulus 16 for the passage of air. Inlet apertures 24 are provided in the lower portion of the side walls 20, 20a so as to direct streams of hot air at the sides of the package 10. In preferred embodiment, the apertures are distributed in a horizontal line. Preferably, two or more series are employed with an additional series in a vertical line above the center of the horizontal series so as to form an inverted T. The distribution of the apertures is of some importance to insure complete shrinkage of the film 40 on the sides of the package 10 to eliminate "capillaries," especially with meat packages to prevent the accumulation of unsightly blood in these capillaries.

The air is forcibly impinged on the sides of the package and is then recovered in an upper central portion of the chamber through an inlet port or aperture 15. Positioned immediately above port 15 and within annulus 16 is a rotatable blowing means 14, such as a rotor impeller or fan. The rotor is driven by any suitable means such as motor 28 attached by shaft 26. Means may be provided for cooling the motor such as a fan blade 32 attached to shaft 26. The housing 31 for the motor may be perforated or lowered so as to permit air to be drawn in by fan blade 32. The housing is attached to wall 8 and rests on a collar 30. An opening 19 may be provided to permit withdrawal upwardly of the fan assembly.

Means for heating the air in the annulus 16 are provided such as electrical resistant rods 18 positioned within the annulus. The casing may be suitably insulated such as by fiberglass 17.

Thus, the air is withdrawn through port 15 by the reduction in pressure created by the rotation of rotor 14. The air is then forced through the annulus 16, past the heating elements 18, where it is heated to heat shrinking temperatures, and is then discharged through apertures 24 as hereinbefore described.

Suitable controls (not shown) may be provided for measuring and controlling air temperatures, air velocities and conveyor speeds.

In operation of the above described apparatus, the motor 28 and the heating elements 18 are activated and the necessary adjustments made so that the desired rate of flow of air and the desired air temperatures are attained. As soon as this condition has been reached, the conveyor drive is operated at the appropriate speed for the products to be treated. A product 10 to be packaged is then placed on the conveyor with a wrapping of any suitable heat shrinkable film surrounding the product. The conveyor 12 carries the product through the tunnel where it is subjected to the hot air therein and the film shrunk around the sides of the product. The product 10 passes out from the tunnel with the film closely conforming to the sides of the product. The flow pattern within the housing is such that the air issues from apertures 24, strikes the sides of the product 10 and then moves up through opening 15 and then driven into the annulus 16 by the impeller.

While certain examples, compositions, process steps, and apparatus elements have been described for purposes of illustration, the invention is not to be so limited. Variation within the scope of the disclosure, drawing and the claims can readily be effected by those skilled in the art.

I claim:
1. Apparatus for heat shrinking thermoplastic film comprising:

(a) an inverted U-shaped housing having vertical side walls and a horizontal top wall forming an open-ended chamber,
(b) an aperture in the central portion of said top wall,
(c) a multiplicity of small apertures in the lower portion of each of said side walls, said multiplicity of apertures constituting the majority of the exit area through the walls of said inverted U-shaped housing,
(d) a casing spaced apart from said housing exteriorly of said chamber forming an annulus with said housing for the passage of air therethrough,
(e) means for heating air within said annulus, and
(f) means for conveying product through said chamber,
(g) and means for blowing air positioned above the aperture in said top wall and within said annulus so as to propel air in series through said annulus, through said small apertures into said chamber and through said aperture in said top wall.

2. Apparatus for heat shrinking film overwrapped about a product comprising:
(a) an inverted U-shaped housing having two vertical side walls interconnected by a horizontal top wall, forming a chamber open at both ends,
(b) a multiplicity of small exit apertures disposed in at least one horizontal line in the lower portion of each of said side walls, said multiplicity of apertures constituting the majority of the exit area through the walls of said inverted U-shaped housing,
(c) a conveying means for transporting packages horizontally through said chamber,
(d) a single hot air reclaiming inlet in the central portion of said top wall,
(e) an insulated casing uniformly spaced apart from said walls exteriorly of said chamber forming a closed and continuous annulus coextensive with the side and top walls,
(f) heating means positioned in said annulus,
(g) a rotatable blowing means positioned within said annulus above said inlet aperture,
(h) means for rotating said blowing means so as to cause air to flow through said annulus past said heating means, through said exit apertures so as to forcibly impinge on the package, and to cause said air to be recovered through said inlet aperture.

3. The apparatus of claim 2 wherein a series of exit apertures is positioned in a vertical row above the horizontal series to form an inverted T.

4. A process for heat shrinking film overwrapped about a product comprising:
(a) forcibly impinging hot air only on the sides of said wrapped product within a heating zone,
(b) recovering hot air only from a single upper central portion of said heating zone,
(c) blowing said hot air through a reheating zone extending around at least a portion of the periphery of said heating zone,
(d) heating said air within said reheating zone,
(e) and discharging streams of said heated air from said reheating zone into said heating zone onto said product.

References Cited
UNITED STATES PATENTS 2,906,627   9/1959   Payton et al.
3,312,811   4/1967   Shanklin _____ 53—184 XR GRANVILLE Y. CUSTER, JR., *Primary Examiner.*